(12) United States Patent
Gao et al.

(10) Patent No.: US 11,057,923 B2
(45) Date of Patent: Jul. 6, 2021

(54) TRANSMISSION METHOD, TERMINAL DEVICE AND BASE STATION

(71) Applicant: CHINA ACADEMY OF TELECOMMUNICATIONS TECHNOLOGY, Beijing (CN)

(72) Inventors: Xuejuan Gao, Beijing (CN); Ekpenyong Tony, Beijing (CN); Fang-Chen Cheng, Beijing (CN)

(73) Assignee: China Academy of Telecommunications Technology, Beijing (CN)

(*) Notice: Subject to any disclaimer, the term of this patent is extended or adjusted under 35 U.S.C. 154(b) by 0 days.

(21) Appl. No.: 16/611,202

(22) PCT Filed: Mar. 29, 2018

(86) PCT No.: PCT/CN2018/081161
§ 371 (c)(1),
(2) Date: Nov. 5, 2019

(87) PCT Pub. No.: WO2018/201829
PCT Pub. Date: Nov. 8, 2018

(65) Prior Publication Data
US 2020/0170033 A1      May 28, 2020

(30) Foreign Application Priority Data
May 5, 2017 (CN) .......................... 201710314182.3

(51) Int. Cl.
*H04W 72/12* (2009.01)
*H04L 1/00* (2006.01)
(Continued)

(52) U.S. Cl.
CPC ....... *H04W 72/1289* (2013.01); *H04L 1/0027* (2013.01); *H04L 1/1812* (2013.01);
(Continued)

(58) Field of Classification Search
None
See application file for complete search history.

(56) References Cited

U.S. PATENT DOCUMENTS 10,958,380 B2 * 3/2021 Park .................. H04W 28/04
2018/0278380 A1 * 9/2018 Kim .................. H04L 1/1861
(Continued)

FOREIGN PATENT DOCUMENTS

CN    103139717 A    6/2013
CN    105530071 A    4/2016
(Continued)

OTHER PUBLICATIONS

LG Electronics: "Discussion on CB group based HARQ operation", 3GPP TSG RAN WG1; R1-1704916, Spokane, USA; Apr. 3, 2017-Apr. 7, 2017.
(Continued)

*Primary Examiner* — Otis L Thompson, Jr.
(74) *Attorney, Agent, or Firm* — Kilpatrick Townsend & Stockton, LLP

(57) ABSTRACT

Embodiment of the present application provides a transmission method, a terminal device, and a base station, used to solve the technical problem in the related art that there is no method supporting CBG-based retransmission and ACK/NACK feedback. The transmission method comprises: receiving by the terminal device a downlink control channel; and acquiring by the terminal device a first indication field from the downlink control channel, the first indication field being used to indicate whether each code block group (CBG) in the corresponding CBGs in an initial transmission of TB needs to be retransmitted.

16 Claims, 3 Drawing Sheets

(51) Int. Cl.
   *H04L 1/18* (2006.01)
   *H04L 5/00* (2006.01)
   *H04W 80/02* (2009.01)
   *H04W 80/08* (2009.01)

(52) U.S. Cl.
   CPC ........... *H04L 5/0055* (2013.01); *H04W 80/02* (2013.01); *H04W 80/08* (2013.01)

(56) References Cited

U.S. PATENT DOCUMENTS

| | | | |
|---|---|---|---|
| 2018/0302191 A1* | 10/2018 | Park | H04L 5/0055 |
| 2020/0059327 A1* | 2/2020 | Kini | H04L 1/1812 |
| 2020/0059329 A1* | 2/2020 | Ma | H04W 72/0413 |
| 2020/0092047 A1* | 3/2020 | Yeo | H04L 1/0065 |
| 2020/0099474 A1* | 3/2020 | Wikstrom | H04L 1/1864 |
| 2020/0100139 A1* | 3/2020 | Kim | H04W 28/04 |
| 2020/0106584 A1* | 4/2020 | Jiang | H04L 1/001 |
| 2020/0145141 A1* | 5/2020 | Park | H04L 5/00 |
| 2020/0154309 A1* | 5/2020 | Takeda | H04W 28/06 |
| 2020/0295873 A1* | 9/2020 | Jayasinghe | H04L 1/0061 |
| 2020/0328848 A1* | 10/2020 | He | H04L 1/1854 |
| 2020/0366444 A1* | 11/2020 | Yang | H04L 5/00 |
| 2020/0374043 A1* | 11/2020 | Lei | H04L 1/1819 |

FOREIGN PATENT DOCUMENTS

| | | | |
|---|---|---|---|
| WO | 2016126330 A1 | 8/2016 | |
| WO | WO-2018128369 A1 * | 7/2018 | ........... H04L 1/0075 |

OTHER PUBLICATIONS

NTT Docomo: "Views on HARQ enhancements for NR", 3GPP TSG RAN WG1; R1-1702815, Athens, Greece; Feb. 13, 2017-Feb. 17, 2017.

Ericsson: "On Protocol Impacts of Code Block Group Based HARQ-ACK Feedback", 3GPP TSG RAN WG1; R1-1706049, Spokane; Apr. 3, 2017-Apr. 7, 2017.

Catt: "Discussion on NR HARQ-ACK feedback mechanisms"; 3GPP TSG RAN WG1 Meeting #88bis; R1-1704583; Spokane, USA, Apr. 3-7, 2017.

Huawei, HiSilicon; "Discussion on CBG-based feedback and retransmission"; 3GPP TSG RAN WG1 Meeting #88bis; R1-1705066; Spokane, USA Apr. 3-7, 2017.

Samsung: "Overview of CBG-based retransmission in NR", 3GPP TSG RAN WG1 Meeting #88bis, R1-1705401, Spokane, USA, Apr. 3-7, 2017.

* cited by examiner

TRANSMISSION METHOD, TERMINAL DEVICE AND BASE STATION

This application is a National Stage of International Application No. PCT/CN2018/081161, filed Mar. 29, 2018, which claims priority to Chinese Patent Application No. 201710314182.3, filed May 5, 2017, both of which are hereby incorporated by reference in their entireties.

FIELD

This application relates to the field of communications technologies, and in particular, to a transmission method, a terminal device, and a base station.

BACKGROUND

In a long term evolution (LTE) system, a physical downlink shared channel (PDSCH) and a physical uplink shared channel (PUSCH) are respectively configured to bear downlink data transmission and uplink data transmission. Each transmission uses a transport block (TB) as a unit. Based on different configured transmission modes, a PDSCH/PUSCH may support transmission of one or two TBs. The downlink data transmission is used as an example. After receiving a PDSCH, a terminal needs to perform acknowledgement (ACK)/non-acknowledgement (NACK) feedback for a TB transmitted in the PDSCH. ACK/NACK feedback is performed based on the TB. To be specific, when spatial combination is not used, each TB corresponds to 1-bit ACK/NACK feedback information which is configured to indicate whether the TB is received correctly. When a PDSCH is configured with transmission of a plurality of TBs, and spatial combination is used, logical and operation needs to be performed on ACK/NACK feedback information corresponding to each TB born by a PDSCH, to obtain 1-bit ACK/NACK feedback information. Uplink data transmission is similar to this.

Due to limitation of complexity of an encoder, a TB needs to be divided into K code blocks (CBs). Coding and cyclic redundancy check (CRC) addition is performed on each CB separately. A plurality of encoded CBs are concatenated together for mapping and transmission. Each CB is independently encoded and includes CRC. Therefore, actually, each CB may generate ACK/NACK feedback information. However, if ACK/NACK feedback is performed for each CB, one TB needs to correspond to K-bit ACK/NACK feedback information, and the feedback quantity is relatively great. In the LTE system, to reduce an ACK/NACK feedback quantity, ACK/NACK feedback is performed only for the TB. In other words, it is determined that a TB is correctly received only when all CBs in the TB are received correctly. The terminal may feed back ACK as feedback information. Once a CB in the TB is received incorrectly, feedback information of the TB is NACK, and a base station side needs to retransmit the TB.

With the development and change of a mobile communication service demand, organizations such as International Telecommunication Union (ITU) and the 3rd Generation Partnership Project (3GPP) start to research a new 5th Generation New RAT (5G NR). A 5G system supports more diversified and complex data transmission. A mechanism is needed to improve transmission efficiency of the system, but the foregoing TB-based transmission and ACK/NACK feedback mechanism that is applied to the LTE system is not applicable to the 5G NR system any more.

In conclusion, no related method that supports CBG-based retransmission and ACK/NACK feedback is available in the related art.

SUMMARY

Embodiments of this application provide a transmission method, a terminal device, and a base station, to resolve a technical problem that there is no CBG-based method for performing retransmission and ACK/NACK feedback in the related art.

In a first aspect, an embodiment of this application provides a transmission method, applied to a terminal device. The transmission method includes: receiving, by the terminal device, a downlink control channel; and obtaining, by the terminal device, a first indicator field from the downlink control channel, where the first indicator field indicates whether each code block group (CBG) of CBGs in an initial transmission of a TB needs to be retransmitted.

Optionally, the first indicator field includes A*M-bit indication information, each TB corresponds to M-bit indication information, and each 1-bit in the M-bit information corresponds to one CBG in an initial transmission of a TB, and indicates whether to retransmit the one CBG, where M is a preset or preconfigured quantity of CBGs into which a TB is divided, A is a quantity of TBs included in a shared channel transmission, and M and A are integers greater than or equal to 1.

Optionally, before the obtaining, by the terminal device, the first indicator field from the downlink control channel, the method further includes: determining, by the terminal device, whether the downlink control channel includes the first indicator field or whether the first indicator field is valid.

Optionally, the determining, by the terminal device, whether the downlink control channel includes the first indicator field or whether the first indicator field is valid includes: when it is determined that the downlink control channel is to schedule a retransmission, determining that the downlink control channel includes the first indicator field or the first indicator field is valid, or when it is determined that the downlink control channel is to schedule an initial transmission, determining that the downlink control channel does not include the first indicator field or the first indicator field is invalid, or the downlink control channel is to schedule a retransmission and/or an initial transmission of the M CBGs; or determining, by the terminal device according to a second indicator field in the downlink control channel, whether the first indicator field exists, or whether the first indicator field is valid, where the second indicator field indicates whether the first indicator field exists or whether the first indicator field is valid; or determining, by the terminal device according to a third indicator field in the downlink control channel, whether the downlink control channel includes the first indicator field or whether the first indicator field is valid, the third indicator field indicates whether the terminal device supports CBG-based transmission, when the third indicator field indicates that the terminal device supports the CBG-based transmission, determining that the first indicator field is included or the first indicator field is valid, and when the third indicator field indicates that the terminal device does not support the CBG-based transmission, determining that the downlink control channel does not include the first indicator field or the first indicator field is invalid; or receiving a higher layer signal, and determining, based on configuration information in the higher layer signal, whether the terminal device supports CBG-based transmission, and if it is determined that the terminal device supports the CBG-based transmission, determining that the downlink control channel includes the first indicator field is included or the first indicator field is valid; when it is determined that the terminal device does not support the CBG-based transmission, determining that the downlink control channel does not include the first indicator field or the first indicator field is invalid.

Optionally, when the terminal device determines, based on the first indicator field, that all CBGs are newly transmitted, the terminal device reports a NDI toggled state to a MAC layer; or when the terminal device determines, based on the first indicator field, that at least one CBG is retransmitted, the terminal device reports a NDI un-toggled state to the MAC layer.

Optionally, before the receiving, by the terminal device, a downlink control channel, the method further includes: receiving a higher layer signal; determining, based on configuration information in the higher layer signal, whether the terminal device supports CBG-based transmission; and when it is determined that the terminal device supports the CBG-based transmission, receiving, by the terminal device, the downlink control channel including the first indicator field.

Optionally, when the terminal device performs ACK/NACK feedback for a CBG scheduled by the downlink control channel, the method further includes: generating, by the terminal device, M*K-bit ACK/NACK feedback information for each TB, where each K-bit corresponds to one CBG, and K-bit ACK/NACK feedback information of each CBG is arranged in a sequence based on the order of corresponding CBGs in an initial transmission of a TB, or in such a manner that feedback information corresponding to an actually received CBG is ordered ahead and place holding feedback information is ordered behind, or in such a manner that feedback information corresponding to an actually received CBG is ordered behind and place holding feedback information is ordered ahead; and when part CBGs corresponding to an initial transmission of a TB are scheduled by the downlink control channel to be retransmitted, generating NACK as place holding information for a location of an un-retransmitted CBG; or generating, by the terminal device, N*K-bit ACK/NACK feedback information, where each K-bit corresponds to one CBG, N is a quantity of CBGs in transmission scheduled by the downlink control channel, and K is a preset or preconfigured integer that is greater than or equal to 1.

In a second aspect, an embodiment of this application provides a terminal device, to which the foregoing transmission method is applicable. The terminal device includes: a first receiving device, configured to receive a downlink control channel; and an obtaining device, configured to obtain a first indicator field from the downlink control channel, where the first indicator field indicates whether each code block group (CBG) of CBGs in an initial transmission of a TB needs to be retransmitted.

Optionally, the first indicator field includes A*M-bit indication information, each TB corresponds to M-bit indication information, and each 1-bit in the M-bit information corresponds to one CBG in an initial transmission of a TB, and indicates whether to retransmit the one CBG, where M is a preset or preconfigured quantity of CBGs into which a TB is divided, A is a quantity of TBs included in a shared channel transmission, and M and A are integers greater than or equal to 1.

Optionally, the terminal device further includes: a first determining device, configured to, before the first indicator field is obtained from the downlink control channel, determine whether the downlink control channel includes the first indicator field or whether the first indicator field is valid.

Optionally, the first determining device is specifically configured to: when it is determined that the downlink control channel is to schedule a retransmission, determine that the downlink control channel includes the first indicator field or the first indicator field is valid, or when it is determined that the downlink control channel is to schedule an initial transmission, determine that the downlink control channel does not include the first indicator field or the first indicator field is invalid; or determine, based on a second indicator field, whether the first indicator field exists, or indicate whether the first indicator field is valid, where the second indicator field indicates whether the first indicator field exists or whether the first indicator field is valid; or determine, according to a third indicator field in the downlink control channel, whether the downlink control channel includes the first indicator field or whether the first indicator field is valid, where the third indicator field indicates whether the terminal device supports CBG-based transmission, when the third indicator field indicates that the terminal device supports the CBG-based transmission, determine that the downlink control channel includes the first indicator field or the first indicator field is valid; when the third indicator field indicates that the terminal device does not support the CBG-based transmission, determine that the downlink control channel does not include the first indicator field or the first indicator field is invalid; or receive a higher layer signal, and determine, based on configuration information in the higher layer signal, whether the terminal device supports CBG-based transmission, and when it is determined that the terminal device supports the CBG-based transmission, determine that the downlink control channel includes the first indicator field or the first indicator field is valid; when it is determined that the terminal device does not support the CBG-based transmission, determine that the downlink control channel does not include the first indicator field or the first indicator field is invalid.

Optionally, the terminal device further includes: a first reporting device, configured to report a NDI toggled state to a MAC layer when the terminal device determines, based on the first indicator field, that all CBGs are newly transmitted; and a second reporting device, configured to report a NDI un-toggled state to the MAC layer when the terminal device determines, based on the first indicator field, that at least one CBG is retransmitted.

Optionally, the terminal device further includes: a second receiving device, configured to receive a higher layer signal before the terminal device receives a downlink control channel; a second determining device, configured to determine, based on configuration information in the higher layer signal, whether the terminal device supports the CBG-based transmission; and a third receiving device, configured to, when it is determined that the terminal device supports the CBG-based transmission, receive, by the terminal device, the downlink control channel including the first indicator field.

Optionally, the terminal device further includes: a feedback device configured to: when the terminal device performs ACK/NACK feedback for a CBG scheduled by the downlink control channel, generate M*K-bit ACK/NACK feedback information for each TB, where each K-bit corresponds to one CBG, and K-bit ACK/NACK feedback information of each CBG is arranged in a sequence based on the order of corresponding CBGs in an initial transmission of a TB, or in such a manner that feedback information corresponding to an actually received CBG is ordered ahead and place holding feedback information is ordered behind, or in such a manner that feedback information corresponding to an actually received CBG is ordered behind and place holding feedback information is ordered ahead; and when part CBGs corresponding to an initial transmission of a TB are scheduled by the downlink control channel to be retransmitted, generate NACK as place holding information for a location of an un-retransmitted CBG; or generate N*K-bit ACK/NACK feedback information, where each K-bit corresponds to one CBG, N is a quantity of CBGs in transmission scheduled by the downlink control channel, and K is a preset or preconfigured integer that is greater than or equal to 1.

In a third aspect, an embodiment of this application further provides a transmission method, applied to a base station. The transmission method includes: sending, by the base station, a downlink control channel, where the downlink control channel includes a first indicator field, and the first indicator field indicates whether each code block group (CBG) of CBGs in an initial transmission of a TB needs to be retransmitted.

Optionally, the first indicator field includes A*M-bit indication information, each TB corresponds to M-bit indication information, and each 1-bit in the M-bit information corresponds to one CBG in an initial transmission of a TB, and indicates whether to retransmit the one CBG, where M is a preset or preconfigured quantity of CBGs into which a TB is divided, A is a quantity of TBs included in a shared channel transmission, and M and A are integers greater than or equal to 1.

Optionally, before the sending, by the base station, the downlink control channel, the method further includes: determining, by the base station, whether the downlink control channel includes the first indicator field or whether the first indicator field is valid.

Optionally, determining, by the base station, whether the downlink control channel includes the first indicator field or whether the first indicator field is valid specifically includes: when it is determined that the downlink control channel is to schedule a retransmission, determining that the downlink control channel includes the first indicator field or the first indicator field is valid, or when it is determined that the downlink control channel is to schedule an initial transmission, determining that the downlink control channel does not include the first indicator field or the first indicator field is invalid; or determining whether the downlink control channel includes the first indicator field or whether the first indicator field is valid, and setting a second indicator field in the downlink control channel, where the second indicator field indicates whether the first indicator field exists or whether the first indicator field is valid; or determining whether a terminal device supports CBG-based transmission, and setting a third indicator field in the downlink control channel, where the third indicator field indicates whether the terminal device supports the CBG-based transmission; and when the third indicator field indicates that the terminal device supports the CBG-based transmission, determining that the downlink control channel includes the first indicator field or the first indicator field is valid; when the third indicator field indicates that the terminal device does not support the CBG-based transmission, determining that the downlink control channel does not include the first indicator field or the first indicator field is invalid; or determining whether a terminal device supports CBG-based transmission, sending a higher layer signal to indicate whether the terminal device supports the CBG-based transmission, and when it is determined that the terminal device supports the CBG-based transmission, determining that the downlink control channel includes the first indicator field or the first indicator field is valid; when it is determined that the terminal device does not support the CBG-based transmission, determining that the downlink control channel does not include the first indicator field or the first indicator field is invalid.

Optionally, before the sending, by the base station, the downlink control channel, the method further includes: sending a higher layer signal, where the higher layer signal indicates whether the terminal device supports the CBG-based transmission; and when it is determined that the terminal device supports the CBG-based transmission, sending, by the base station, the downlink control channel including the first indicator field.

Optionally, when receiving ACK/NACK feedback performed by a terminal device for a CBG scheduled by the downlink control channel, the method further includes: determining, by the base station, that the terminal device generates M*K-bit ACK/NACK feedback information for each TB, where each K-bit corresponds to one CBG, and K-bit ACK/NACK feedback information of each CBG is arranged in a sequence based on the order of corresponding CBGs in an initial transmission of a TB, or in such a manner that feedback information corresponding to an actually received CBG is ordered ahead and place holding feedback information is ordered behind, or in such a manner that feedback information corresponding to an actually received CBG is ordered behind and place holding feedback information is ordered ahead; and part CBGs corresponding to an initial transmission of a TB are scheduled by the downlink control channel to be retransmitted, generating NACK as place holding information for a location of an un-retransmitted CBG; or determining, by the base station, that the terminal device generates N*K-bit ACK/NACK feedback information, where each K-bit corresponds to one CBG, N is a quantity of CBGs in transmission scheduled by the downlink control channel, and K is a preset or preconfigured integer that is greater than or equal to 1.

In a fourth aspect, an embodiment of this application further provides a base station, to which the foregoing transmission method in the third aspect is applicable. The base station includes: a transmitting device, configured to send a downlink control channel, where the downlink control channel includes a first indicator field, and the first indicator field indicates whether each code block group (CBG) of CBGs in an initial transmission of a TB needs to be retransmitted.

Optionally, the first indicator field includes A*M-bit indication information, each TB corresponds to M-bit indication information, and each 1-bit in the M-bit information corresponds to one CBG in an initial transmission of a TB, and indicates whether to retransmit the one CBG, where M is a preset or preconfigured quantity of CBGs into which a TB is divided, A is a quantity of TBs included in a shared channel transmission, and M and A are integers greater than or equal to 1.

Optionally, the base station further includes: a first determining device, configured to, before the base station sends the downlink control channel, determine whether the downlink control channel includes the first indicator field or whether the first indicator field is valid.

Optionally, the first determining device is further configured to: when it is determined that the downlink control channel is to schedule retransmission, determine that the downlink control channel includes the first indicator field or the first indicator field is valid, or when it is determined that the downlink control channel is to schedule an initial transmission, determine that the downlink control channel does not include the first indicator field or the first indicator field is invalid; or determine whether the downlink control channel includes the first indicator field or whether the first indicator field is valid, and set a second indicator field in the downlink control channel, where the second indicator field indicates whether the first indicator field exists or indicate whether the first indicator field is valid; or determine whether the terminal device supports the CBG-based transmission, and set a third indicator field in the downlink control channel, where the third indicator field indicates whether the terminal device supports the CBG-based transmission; and when the third indicator field indicates that the terminal device supports the CBG-based transmission, determine that the downlink control channel includes the first indicator field or the first indicator field is valid; when the third indicator field indicates that the terminal device does not support the CBG-based transmission, determine that the downlink control channel does not include the first indicator field or the first indicator field is invalid; or determine whether a terminal device supports the CBG-based transmission, and send a higher layer signal to indicate whether the terminal device supports the CBG-based transmission, and when it is determined that the terminal device supports the CBG-based transmission, determine that the downlink control channel includes the first indicator field or the first indicator field is valid; when it is determined that the terminal device does not support the CBG-based transmission, determine that the downlink control channel does not include the first indicator field or the first indicator field is invalid.

Optionally, the transmitting device is further configured to: send a higher layer signal before the base station sends the downlink control channel, where the higher layer signal indicates whether a terminal device supports the CBG-based transmission; and when it is determined that the terminal device supports the CBG-based transmission, send, by the base station, the downlink control channel including the first indicator field.

Optionally, the base station further includes: a second determining device configured to: when receiving ACK/NACK feedback performed by the terminal device for a CBG scheduled by the downlink control channel, determine that the terminal device generates M*K-bit ACK/NACK feedback information for each TB, where each K-bit corresponds to one CBG, and K-bit ACK/NACK feedback information of each CBG is arranged in a sequence based on the order of corresponding CBGs in an initial transmission of a TB, or in such a manner that feedback information corresponding to an actually received CBG is ordered ahead and place holding feedback information is ordered behind, or in such a manner that feedback information corresponding to an actually received CBG is ordered behind and place holding feedback information is ordered ahead; and if part CBGs corresponding to an initial transmission of a TB are scheduled by the downlink control channel to be retransmitted, generate NACK as place holding information for a location of an un-retransmitted CBG; or determine that the terminal device generates N*K-bit ACK/NACK feedback information, where each K-bit corresponds to one CBG, N is a quantity of CBGs in transmission scheduled by the downlink control channel, and K is a preset or preconfigured integer that is greater than or equal to 1.

In a fifth aspect, Embodiment 5 of this application provides a computer apparatus. The apparatus includes a processor. The processor is configured to execute a computer program stored in a memory, to implement the operations in the method according to Embodiment 1 and Embodiment 3.

In a sixth aspect, Embodiment 6 of this application provides a computer readable storage medium, storing a computer program. When the computer program is executed by a processor, the operations in the method according to Embodiment 1 and Embodiment 3 are implemented.

In a seventh aspect, Embodiment 7 of this application provides a transmission apparatus, including: a memory, configured to store a program instruction; and a processor configured to invoke the program instruction stored in the memory, and perform the following operations according to the obtained program instruction: receiving a downlink control channel; and obtaining a first indicator field from the downlink control channel, where the first indicator field indicates whether each code block group (CBG) of CBGs in an initial transmission of a TB needs to be retransmitted.

In an eighth aspect, Embodiment 8 of this application provides a transmission apparatus, including: a memory, configured to store a program instruction; and a processor, configured to invoke the program instruction stored in the memory, and perform the following operation according to the obtained program instruction: sending a downlink control channel, where the downlink control channel includes a first indicator field, and the first indicator field indicates whether each code block group (CBG) of CBGs in an initial transmission of a TB needs to be retransmitted.

One or more technical solutions of the foregoing technical solutions have the following technical effects or benefits.

In the transmission method provided in the embodiments of this application, a terminal device receives a downlink control channel, and then obtains a first indicator field from the downlink control channel, where the first indicator field indicates whether each code block group (CBG) of CBGs in an initial transmission of a TB needs to be retransmitted, to resolve a technical problem that no method supporting CBG-based retransmission and ACK/NACK feedback is available in the related art, and achieve a technical effect of improving transmission performance.

BRIEF DESCRIPTION OF THE DRAWINGS

To describe the technical solutions in the embodiments of this application or in the related art more clearly, the following briefly introduces the accompanying drawings required for describing the embodiments or the related art. Apparently, the accompanying drawings in the following descriptions show merely some embodiments of this application, and a person of ordinary skill in the art may derive other drawings from these accompanying drawings without creative efforts.

DETAILED DESCRIPTION OF THE EMBODIMENTS

To make the objectives, technical solutions, and advantages of this application clearer, the following further describes this application in detail with reference to the accompanying drawings. Apparently, the described embodiments are some but not all of the embodiments of this application. All other embodiments obtained by a person of ordinary skill in the art based on the embodiments of this application without creative efforts shall fall within the protection scope of this application.

First, a related concept of a code block group (CBG) is described.

Currently, a concept of CBG-based transmission and ACK/NACK feedback is provided in a 5G NR system. To be specific, after a TB is divided by code blocks into K number of CBs, the K number of CBs may be divided into a plurality of CBGs in a preset rule, and each CBG may include one CB, or may include K number of CBs (namely, a TB).

When CBG-based retransmission and ACK/NACK is supported in the 5G-NR system, due to an error possibility of ACK/NACK transmissions, a terminal device may feed back NACK information on CBG transmission, while a base station may consider the NACK as ACK; or the terminal device may feed back ACK information on CBG transmission, while a base station may consider the ACK as NACK. Therefore, the terminal device and the base station have inconsistent understandings of a retransmitted CBG, which causes inaccurate combination of hybrid automatic repeat requests (HARQ).

A transmission method in the embodiments of this application may be applied to a terminal device. The terminal device may be a user equipment (UE) such as a mobile phone and a computer, etc. A specific type of the terminal device is not specifically limited in this application.

The transmission method in the embodiments of this application may, but not limited to, be applied to a 5G NR system. The method is also applicable to another system, such as an LTE system. In addition, terms "first", "second", "third", and the like in the embodiments of this application are merely used for distinguishing, but not for any limitation.

To understand the foregoing technical solutions better, the following describes the foregoing technical solutions in detail with reference to the accompanying drawings of this specification and embodiments.

Embodiment 1

Figure 1:
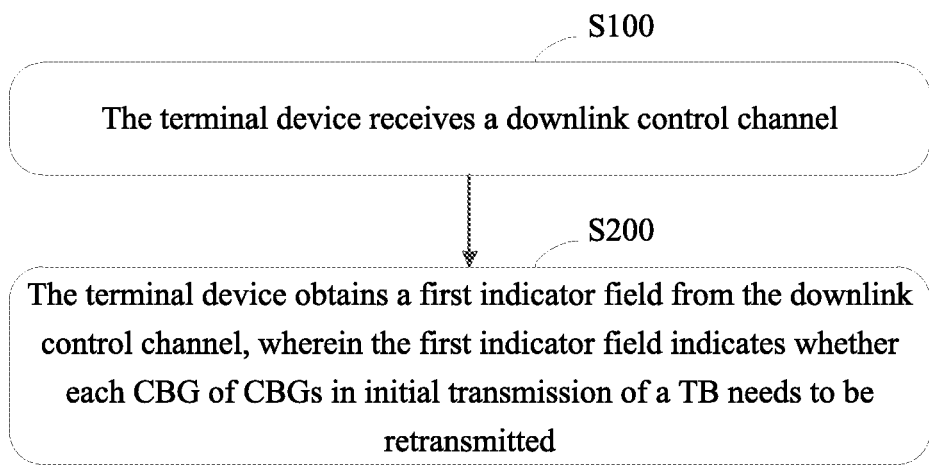
FIG. 1 is a schematic flowchart of a transmission method applied to a terminal device according to an embodiment of this application.

Referring to FIG. 1, an embodiment of this application provides a transmission method, applied to a terminal device. A process of the transmission method may be described as follows.

S100: The terminal device receives a downlink control channel.

S200: The terminal device obtains a first indicator field from the downlink control channel. The first indicator field indicates whether each code block group (CBG) of CBGs in an initial transmission of a TB needs to be retransmitted.

In the embodiments of this application, the first indicator field may be used to indicate CBGs that are of CBGs into which a TB is divided in an initial transmission and that are included in a shared channel scheduled by the downlink control channel for retransmission.

Optionally, before S100, the transmission method in the embodiments of this application further includes: the terminal device determines that whether the downlink control channel includes the first indicator field or whether the first indicator field is valid.

The first indicator field is valid means that the terminal device needs to read the first indicator field and then perform a corresponding operation based on indication of the first indicator field. The first indicator field is invalid means that the downlink control channel has the first indicator field, but the first indicator field does not have any indication function. In this case, when the terminal device receives the downlink control channel, it may be consumed that the downlink control channel includes an M-bit indicator field or A*M-bit first indicator field. However, no attention is paid to specific content of the first indicator field, and a bit status of this part of an indication may not be parsed.

In addition, when the downlink control channel is to schedule retransmission, the downlink control channel includes a first indicator field; and when the downlink control channel is to schedule an initial transmission, the downlink control channel does not include the first indicator field. The terminal device may use different downlink control information (DCI) formats for a downlink control channel configured to schedule retransmission and a downlink control channel configured to schedule an initial transmission.

Optionally, the terminal device may determine whether the downlink control channel includes the first indicator field or whether the first indicator field is valid in, but not limited to, the following manners.

Manner 1: When it is determined that the downlink control channel is to schedule retransmission, it is determined that the downlink control channel includes the first indicator field or the first indicator field is valid, or when it is determined that the downlink control channel is to schedule an initial transmission, it is determined that the downlink control channel does not include the first indicator field or the first indicator field is invalid.

During actual application, retransmission is scheduled. To be specific, a HARQ process number indicated in the downlink control channel is the same as a HARQ process number corresponding to a TB that has been received by the terminal device, and retransmission is determined based on another indicator field, for example, a new data indication (NDI), an indicator field that may indicate whether the downlink control channel corresponds to retransmission, or the like. Alternatively, sizes of DCIs or radio network temporary identities (RNTI) corresponding to a retransmission and an initial transmission are different, thus, the terminal device may determine whether it is an initial transmission or a retransmission based on a detected size of a DCI or a detected RNTI.

Manner 2: when the downlink control channel includes a second indicator field where the second indicator field indicates whether the first indicator field exists or indicate whether the first indicator field is valid, based on the second indicator field, the terminal device determines whether the first indicator field exists or indicates whether the first indicator field is valid.

The second indicator field and the first indicator field may be encoded independently, or at least when the second indicator field indicates whether the first indicator field exists, independent encoding is needed. For example, the second indicator field is 1 bit, "0" indicates that the first indicator field is not included, and "1" indicates that the first indicator field is included; or "1" indicates that the first indicator field is not included, and "0" indicates that the first indicator field is included. When receiving the downlink control channel, the terminal device first parses the second indicator field, and determines, based on the second indicator field, whether the first indicator field is included or whether the first indicator field is valid. To indicate whether the first indicator field is valid, either independent encoding or combined encoding may be performed. An indication manner is similar to the foregoing manner. Details are not described again in the embodiments of this application.

Manner 3: When the downlink control channel includes a third indicator field where the third indicator field indicates whether the terminal device supports the CBG-based transmission, it is determined that the first indicator field is included or the first indicator field is valid when the third indicator field indicates that the terminal device supports the CBG-based transmission; it is determined that the first indicator field is not included or the first indicator field is invalid, when the third indicator field indicates that the terminal device does not support the CBG-based transmission.

Manner 4: A higher layer signal is received, based on configuration information in the higher layer signal, whether the terminal device supports the CBG-based transmission is determined, and if it is determined that the terminal device supports the CBG-based transmission, it is determined that the first indicator field is included or the first indicator field is valid; if it is determined that the terminal device does not support the CBG-based transmission, it is determined that the first indicator field is not included or the first indicator field is invalid.

Certainly, during actual application, the terminal device may not determine whether the downlink control channel includes the first indicator field or whether the first indicator field is valid. Regardless of whether the downlink control channel is to schedule an initial transmission or a retransmission, the terminal device determines that the downlink control channel always includes the first indicator field, that is, a downlink control channel configured to schedule the retransmission and a downlink control channel configured to schedule the initial transmission use a same DCI format.

Optionally, before S100, the transmission method in the embodiments of this application further includes: a higher layer signal is received; based on configuration information in the higher layer signal, whether the terminal device supports the CBG-based transmission is determined; if it is determined that the terminal device supports the CBG-based transmission, the terminal device receives the downlink control channel including the first indicator field.

In the embodiments of this application, before receiving the downlink control channel including the first indicator field, the terminal device may receive the higher layer signal. Then, the terminal device may determine, based on configuration of the higher layer signal, whether the CBG-based retransmission is supported. When determining that the CBG-based retransmission is supported, the terminal device receives the downlink control channel; or when determining that the CBG-based retransmission is not supported, the terminal device may receive a downlink control channel based on a size of a DCI that does not include the first indicator field, or may receive a downlink control channel based on a size of a DCI that includes the first indicator field.

In S200, the first indicator field may be configured to indicate whether each CBG of corresponding CBGs in an initial transmission of a TB needs to be retransmitted.

Optionally, the first indicator field includes A*M-bit indication information, each TB corresponds to M-bit indication information, and each 1-bit in the M-bit information corresponds to one CBG in an initial transmission of a TB, and indicates whether to retransmit the one CBG, where M is a preset or preconfigured quantity of CBGs into which a TB is divided, A is a quantity of TBs included in a shared channel transmission, and M and A are integers greater than or equal to 1.

Figure 2:
FIG. 2 is a schematic diagram of first indicator fields corresponding to each TB that may be adjacent to be used as one indicator field according to an embodiment of this application.
Figure 3:
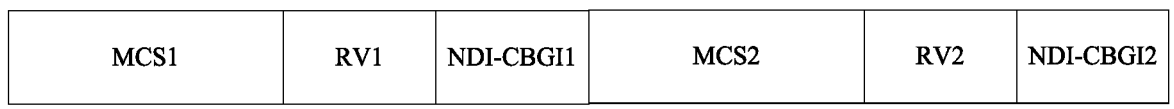
FIG. 3 is a schematic diagram of first indicator fields corresponding to each TB that may be used as two indicator fields respectively according to an embodiment of this application.

For example, if current transmission includes only one TB, the first indicator field has M bits; or if the current transmission includes A number of TBs, the first indicator field has A*M bits. As shown in FIG. 2, when the current transmission includes a plurality of TBs, first indicator fields corresponding to each TB may be adjacent to be used as one indicator field; or as shown in FIG. 3, when the current transmission includes a plurality of TBs, first indicator fields corresponding to each TB may alternatively be separate, and be respectively used as two first indicator fields. In FIG. 2, MCS represents a modulation and coding scheme, RV represents a redundancy version, and NDI-CBGI represents a combined field of a NDI and a CBG indicator field, namely, a first indicator field used to implement an indicator field indicating whether a transmission state at a location of a CBG and a CBG at a corresponding location is an initial transmission or a retransmission.

Alternatively, as shown in FIG. 3, when the current transmission includes a plurality of TBs, first indicator fields corresponding to each TB may alternatively be separate, and be used at two first indicator fields respectively. A specific manner may be determined according to actual conditions, and is not specifically in this embodiment of this application.

For example, when information about a 1-bit first indicator field corresponding to a CBG is "0", it indicates an initial transmission or indicates that a retransmission is not needed; or when information about a 1-bit first indicator field corresponding to a CBG is "1", it indicates a retransmission or indicates that a transmission is needed this time. If all the M bits are "0", it indicates an initial transmission of a new TB, that is, all CBGs are newly transmitted. If all the M bits are "1", it indicates a retransmission of an original TB, that is, all CBGs of the TB need to be retransmitted. Conversely, "1" represents an initial transmission, and "0" represents a retransmission.

Optionally, when the terminal device performs ACK/NACK feedback for a CBG scheduled by the downlink control channel, the method may further include: by the terminal device, M*K-bit ACK/NACK feedback information for each TB is generated, where each K-bit information corresponds to one CBG, and K-bit ACK/NACK feedback information corresponding to each CBG is arranged in a sequence of a corresponding CBG in an initial transmission of a TB, or in such a manner that feedback information corresponding to an actually received CBG is ordered ahead and place holding feedback information is ordered behind, or in such a manner that feedback information corresponding to an actually received CBG is ordered behind and place holding feedback information is ordered ahead; and if retransmission scheduled by the downlink control channel is retransmission of some of CBGs corresponding to an initial transmission of a TB, NACK as place holding information for a location of an un-retransmitted CBG is generated; or, by the terminal device, N*K-bit ACK/NACK feedback information is generated, where each K-bit information corresponds to one CBG, N is a quantity of CBGs in transmission scheduled by the downlink control channel, and K is a preset or preconfigured integer that is greater than or equal to 1.

During actual application, in the initial transmission, one TB is divided into four CBGs. When receiving the initial transmission of the TB, the terminal device receives the four CBGs, and generates 1-bit ACK/NACK feedback information for each CBG according to a receiving condition, where the 1-bit ACK/NACK feedback information is obtained after logical and operation is performed on ACK/NACK feedback information of each CB included in the CBGs. 4-bit ACK/NACK feedback information in total is obtained, and may be, for example, ACK, NACK, NACK, and ACK.

Then, the feedback information is fed back to the base station. After receiving the feedback information, the base station may determine that a second CBG and a third CBG of the TB need to be retransmitted, and send a downlink control channel to the terminal device. Assuming that "1" represents retransmission, and "0" represents an initial transmission, the first indicator field in the downlink control channel is "0110". After receiving the downlink control channel, the terminal device further receives CBG2 and CBG3 that correspond to the first indicator field "0110" and that are in retransmission of a shared channel. Then, the terminal device generates ACK/NACK feedback information for a retransmitted CBG based on a receiving condition. For example, the feedback information may be ACK, ACK, or the like.

During actual application, the terminal may generate 4-bit ACK/NACK all the time when reporting ACK/NACK, and generate NACK as place holding information for CBG1 and CBG4 that are determined, based on the first indicator field, not to be retransmitted.

The 4-bit ACK/NACK feedback information reported by the terminal may be ordered in, but not limited to, the following manners.

Manner 1: Feedback information corresponding to an actually received retransmitted CBG may be ordered ahead, and place holding NACK is added behind for supplementation.

For example, if CBG2 and CBG3 are retransmitted, CBG1 and CBG4 do not need to be retransmitted, and NACK is generated to be used as place holding information, feedback information may be ACK, ACK, NACK, and NACK.

Or vice versa, the feedback information corresponding to the actually received retransmitted CBG may be ordered behind, and the place holding NACK is added ahead for supplementation. For example, the feedback information may be NACK, NACK, ACK, and ACK.

Manner 2: Ranking may alternatively be performed according to numbers of the CBGs obtained through dividing in the initial transmission of the TB.

For example, the CBGs obtained through dividing in the initial transmission of the TB are CBG1, CBG2, CBG3, and CBG4. ACK/NACK of retransmitted CBG2 and CBG3 are ordered in the middle, 1-bit NACK is added ahead CBG2 to be used as feedback information of CBG1, and 1-bit NACK is added behind CBG3 to be used as feedback information of CBG2, that is, the 4-bit ACK/NACK feedback information may be NACK, ACK, ACK, and NACK.

It should be noted that the base station can correctly recognize feedback information of a retransmitted CBG that is fed back by the terminal device, provided that the terminal device and the base station pre-agree on a ranking manner.

Alternatively, the ACK/NACK feedback information reported by the terminal may not be ordered. To be specific, when reporting ACK/NACK, the terminal device performs reporting only for a retransmitted CBG, that is, only generates 2-bit ACK/NACK feedback information for reporting. For example, the feedback information is ACK, and ACK. Because the base station knows that only two CBGs are retransmitted, the base station may also determine that the terminal device only feeds back 2-bit ACK/NACK, thereby correctly receiving the ACK/NACK. Because the terminal device performs reporting only for a retransmitted CBG, a technical effect of reducing a quantity of feedback information is achieved.

Optionally, when the terminal device determines, based on the first indicator field, that all CBGs are all newly transmitted, the terminal device reports a NDI un-toggled state to a media access control (Media Access Control, MAC) layer; or when the terminal device determines, based on the first indicator field, that at least one CBG is retransmitted, the terminal device reports a NDI toggled state to the MAC layer.

When the terminal device determines, based on the first indicator field, that all CBGs are all newly transmitted, the terminal device reports a NDI toggled (toggled) state to the MAC layer, indicating that the downlink control channel schedules the initial transmission, that is, the initial transmission indicating that previous TB transmission is correct; or when the terminal device determines, based on the first indicator field, that at least one CBG is retransmitted, the terminal device reports a NDI un-toggled (not toggled) state to the MAC layer, indicating that the downlink control channel schedules retransmission, that is, at least one CBG of a previous TB needs to be retransmitted. In other words, in CBG-based transmission, it may be determined, based on indicator fields of a plurality of CBGs, whether to perform retransmission or new transmission. Then, a NDI state corresponding to retransmission or new transmission is reported to a higher layer.

In this embodiment of this application, if it is downlink transmission, the terminal device may receive, based on the first indicator field, a shared channel corresponding to the downlink control channel.

For example, if the downlink control channel may include a first indicator field, and bits of the first indicator field are all "0", an initial transmission of a TB may be represented. In this case, the TB does not need to be combined with a TB stored in a buffer. If the downlink control channel includes a first indicator field, and any bit of the first indicator field is "1", it indicates that a previous TB needs to be retransmitted, that is, one or more CBGs in a TB corresponding to a HARQ process number indicated by the downlink control channel need to be retransmitted. Then, the terminal receives a corresponding shared channel based on the downlink control channel, and combines received retransmitted CBGs of the TB with corresponding CBG information stored in the buffer.

If it is uplink transmission, the terminal device may send, based on the first indicator field, a shared channel transmission corresponding to the downlink control channel. In other words, during an initial transmission, the downlink control channel may also include first indicator fields. For example, the first indicator fields are all "0", which represents an initial transmission of a TB; and the terminal device takes a TB from to-be-transmitted data for the initial transmission. In this case, combination is not needed. If any bit in the first indicator field is "1", it represents retransmission, specifically, retransmission of one or more CBGs in a TB corresponding to a HARQ process number indicated by the downlink control channel. Which CBGs in the TB are retransmitted may be indicated by the first indicator field. Then, the terminal device may obtain corresponding CBGs in the TB from the buffer based on the CBGs in the TB that need to be retransmitted under the indication of the first indicator field, and send these to-be-retransmitted CBGs on the shared channel based on scheduling information in the downlink control channel. After receiving these CBGs, a base station side combines the received retransmitted CBGs in the TB with corresponding CBG information stored in the buffer.

In the following, the embodiments of this application describe an application scenario of the transmission method during actual application by using an example.

A TB is transmitted between the terminal device and the base station is used as an example. It is assumed that "0" represents an initial transmission, and "1" represents a retransmission. If a TB may be regularly divided into four 4 CBGs, a first indicator field may have 4 bits. The terminal device receives a downlink control channel at a slot 1, and schedules the initial transmission of TB1 that is performed in a shared channel transmission. A HARQ process number indicated in the downlink control channel is 0, that is, a HARQ process number corresponding to the TB1 is 0. Four bits of the first indicator field in the downlink control channel are "0000". To be specific, the TB1 is divided into four CBGs, namely CBG1, CBG2, CBG3, and CBG4 which are transmitted for the first time. After receiving four CBGs in the slot 1, the terminal device generates 1-bit ACK/NACK feedback information for each CBG. For example, if the terminal device receives CBG1, CBG3, and CBG4 correctly, and receives CBG2 incorrectly, the terminal device feeds back ACK, NACK, ACK, and ACK.

If the base station receives feedback information of the terminal device correctly, the base station determines that only CBG2 needs to be retransmitted. For example, retransmission is performed in a slot 3. The base station sends a downlink control channel in the slot 3, sets a first indicator field in the downlink control channel to "0100", and sets a HARQ process number to 0, to indicate retransmission of TB1 and indicate that only CBG2 is retransmitted. The terminal device receives the downlink control channel in the slot 3, determines, based on the HARQ process number and the first indicator field in the downlink control channel, to perform retransmission for TB1 and that only CBG2 is retransmitted, receives the downlink shared channel in the manner, and combines retransmitted information of CBG2 with information of CBG2 that is received in the previous initial transmission and that is stored in the buffer, to improve demodulation performance.

Alternatively, even if feedback information that is of the terminal device and that is received by the base station has an error, for example, feedback information parsed by the base station is ACK, NACK, ACK, and NACK, the base station determines that CBG2 and CBG4 need to be retransmitted, for example, retransmitted in the slot 3. When sending a downlink control channel in the slot 3, the base station sets the first indicator field in the downlink control channel as "0101", and sets the HARQ process number as 0, to indicate retransmission of TB1 and indicate that CBG2 and CBG4 are retransmitted. The terminal device receives the downlink control channel in the slot 3, determines, based on the HARQ process number and the first indicator field in the downlink control channel, to perform retransmission for TB1 and that CBG2 and CBG4 are retransmitted, receives the downlink shared channel in the manner, and combines retransmitted information of CBG2 and CBG4 with information of CBG2 and CBG4 that is received in the previous initial transmission and that is stored in the buffer, to improve demodulation performance.

According to the foregoing method, regardless of whether the feedback information of the terminal device is parsed correctly by the base station, the terminal device determines, based on the first indicator field in the downlink control channel sent by the base station, which CBG is retransmitted, thereby determining how to combine received data and data in the buffer, avoiding a case that the terminal device and the base station have inconstant understandings of a quantity of retransmitted CBGs and a number, and further avoiding an incorrect buffer combination on a terminal device side.

Embodiment 2

Figure 4:
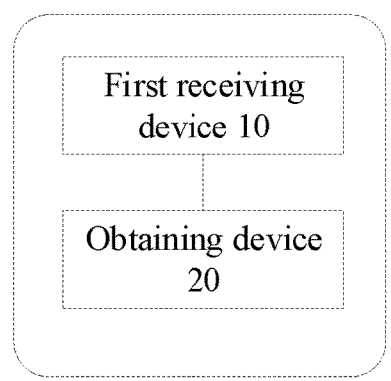
FIG. 4 is a schematic diagram of devices in a terminal device according to an embodiment of this application.

Referring to FIG. 4, based on an inventive concept the same as that of Embodiment 1, an embodiment of this application further provides a terminal device. The terminal device includes: a first receive device 10, configured to receive a downlink control channel; and an obtaining device 20, configured to obtain a first indicator field from the downlink control channel, where the first indicator field indicates whether each code block group (CBG) of CBGs in an initial transmission of a TB needs to be retransmitted.

Optionally, the first indicator field includes A*M-bit indication information, each TB corresponds to M-bit indication information, and each 1-bit in the M-bit information corresponds to one CBG in an initial transmission of a TB, and indicates whether to retransmit the one CBG, where M is a preset or preconfigured quantity of CBGs into which a TB is divided, A is a quantity of TBs included in a shared channel transmission, and M and A are integers greater than or equal to 1.

Optionally, the terminal device further includes: a first determining device, configured to, before the first indicator field is obtained from the downlink control channel, determine whether the downlink control channel includes the first indicator field or whether the first indicator field is valid.

The first determining device is further configured to: when it is determined that the downlink control channel is to schedule retransmission, determine that the downlink control channel includes the first indicator field or the first indicator field is valid, or when it is determined that the downlink control channel is to schedule an initial transmission, determine that the downlink control channel does not include the first indicator field or the first indicator field is invalid.

Alternatively, the first determining device is further configured to, when the downlink control channel includes a second indicator field where the second indicator field indicates whether the first indicator field exists or whether the first indicator field is valid, determine, based on the second indicator field, whether the first indicator field exists, or indicate whether the first indicator field is valid.

Alternatively, the downlink control channel includes a third indicator field where the third indicator field indicates whether the terminal device supports CBG-based transmission, the first determining device is further configured to determine, according to the third indicator field, whether the downlink control channel includes the first indicator field or whether the first indicator field is valid. When the third indicator field indicates that the terminal device supports the CBG-based transmission, determine that the downlink control channel includes the first indicator field or the first indicator field is valid; when the third indicator field indicates that the terminal device does not support the CBG-based transmission, determine that the downlink control channel does not include the first indicator field or the first indicator field is invalid.

Alternatively, the first determining device is further configured to receive a higher layer signal, and determine, based on configuration information in the higher layer signal, whether the terminal device supports CBG-based transmission, and if it is determined that the terminal device supports the CBG-based transmission, determine that the downlink control channel includes the first indicator field or the first indicator field is valid; when it is determined that the terminal device does not support the CBG-based transmission, determine that the first indicator field is not included or the first indicator field is invalid.

Optionally, the terminal device further includes: a first reporting device, configured to, when the terminal device determines, based on the first indicator field, that all CBGs are newly transmitted, report a NDI un-toggled state to a media access control (MAC) layer; and a second reporting device, configured to report a NDI toggled state to the MAC layer when the terminal device determines, based on the first indicator field, that at least one CBG is retransmitted.

The terminal device further includes: a second receiving device, configured to receive a higher layer signal before the terminal device receives the downlink control channel; a second determining device, configured to determine, based on configuration information in the higher layer signal, whether the terminal device supports CBG-based transmission; and a third receiving device, configured to, if it is determined that the terminal device supports the CBG-based transmission, receive, by the terminal device, the downlink control channel including the first indicator field.

Optionally, the terminal device further includes a feedback device configured to: when the terminal device performs ACK/NACK feedback for a CBG scheduled by the downlink control channel, generate M*K-bit ACK/NACK feedback information for each TB, where each K-bit corresponds to one CBG, and K-bit ACK/NACK feedback information corresponding to each CBG is arranged in a sequence of a corresponding CBG in an initial transmission of a TB, or in such a manner that feedback information corresponding to an actually received CBG is ordered ahead and place holding feedback information is ordered behind, or in such a manner that feedback information corresponding to an actually received CBG is ordered behind and place holding feedback information is ordered ahead; and if retransmission scheduled by the downlink control channel is retransmission of some of CBGs corresponding to an initial transmission of a TB, generate NACK as place holding information for a location of an un-retransmitted CBG; or generate N*K-bit ACK/NACK feedback information, where each K-bit information corresponds to one CBG, N is a quantity of CBGs in transmission scheduled by the downlink control channel, and K is a preset or preconfigured integer that is greater than or equal to 1.

Embodiment 3

An embodiment of this application further provides a transmission method applied to a base station. The transmission method includes: a downlink control channel is sent by the base station, where the downlink control channel includes a first indicator field, and the first indicator field indicates whether each code block group (CBG) of CBGs in an initial transmission of a TB needs to be retransmitted.

Optionally, the first indicator field includes A*M-bit indication information, each TB corresponds to M-bit indication information, and each 1-bit in the M-bit information corresponds to one CBG in an initial transmission of a TB, and indicates whether to retransmit the one CBG, where M is a preset or preconfigured quantity of CBGs into which a TB is divided, A is a quantity of TBs included in a shared channel transmission, and M and A are integers greater than or equal to 1.

Optionally, before the sending, by the base station, the downlink control channel, the method further includes: whether the downlink control channel includes the first indicator field or whether the first indicator field is valid is determined by the base station.

Optionally, the determining, by the base station, whether the downlink control channel includes the first indicator field or whether the first indicator field is valid includes: when it is determined that the downlink control channel is to schedule retransmission, it is determined that the downlink control channel includes the first indicator field or the first indicator field is valid, or when it is determined that the downlink control channel is to schedule an initial transmission, is it determined that the downlink control channel does not include the first indicator field or the first indicator field is invalid; or whether the first indicator field is included or whether the first indicator field is valid is determined, and a second indicator field in the downlink control channel is set, where the second indicator field indicates whether the first indicator field exists or indicate whether the first indicator field is valid; or whether the terminal device supports CBG-based transmission is determined, and a third indicator field in the downlink control channel is set, where the third indicator field indicates whether the terminal device supports the CBG-based transmission; and when the third indicator field indicates that the terminal device supports the CBG-based transmission, it is determined that the first indicator field is included or the first indicator field is valid; otherwise, it is determined that the first indicator field is not included or the first indicator field is invalid; or whether the terminal device supports the CBG-based transmission is determined, a higher layer signal is sent to indicate whether the terminal device supports the CBG-based transmission, and if it is determined that the terminal device supports the CBG-based transmission, it is determined that the first indicator field is included or the first indicator field is valid; otherwise, it is determined that the first indicator field is not included or the first indicator field is invalid.

Optionally, before the sending, by the base station, the downlink control channel, the method further includes: a higher layer signal is sent, where the higher layer signal indicates whether a terminal device supports the CBG-based transmission; and if it is determined that the terminal device supports the CBG-based transmission, the downlink control channel including the first indicator field is sent by the base station.

Optionally, when receiving ACK/NACK feedback performed by the terminal device for a CBG scheduled by the downlink control channel, the method further includes: the base station determines that the terminal device generates M*K-bit ACK/NACK feedback information for each TB, where each K-bit information corresponds to one CBG, and K-bit ACK/NACK feedback information of each CBG is arranged in a sequence based on the order of corresponding CBGs in an initial transmission of a TB, or in such a manner that feedback information corresponding to an actually received CBG is ordered ahead and place holding feedback information is ordered behind, or in such a manner that feedback information corresponding to an actually received CBG is ordered behind and place holding feedback information is ordered ahead; and if part CBGs corresponding to an initial transmission of a TB are scheduled by the downlink control channel to be retransmitted, NACK as place holding information is generated for a location of an un-retransmitted CBG; or the base station determines that the terminal device generates N*K-bit ACK/NACK feedback information, where each K-bit corresponds to one CBG, N is a quantity of CBGs in transmission scheduled by the downlink control channel, and K is a preset or preconfigured integer that is greater than or equal to 1.

Embodiment 4

An embodiment of this application further provides a base station. The base station includes: a transmitting device, configured to send a downlink control channel, where the downlink control channel includes a first indicator field, and the first indicator field indicates whether each code block group (CBG) of CBGs in an initial transmission of a TB needs to be retransmitted.

The first indicator field includes A*M-bit indication information, each TB corresponds to M-bit indication information, and each 1-bit in the M-bit information corresponds to one CBG in an initial transmission of a TB, and indicates whether to retransmit the one CBG, where M is a preset or preconfigured quantity of CBGs into which a TB is divided, A is a quantity of TBs included in a shared channel transmission, and M and A are integers greater than or equal to 1.

Optionally, the base station further includes: a determining device, configured to, before the base station sends the downlink control channel, determine whether the downlink control channel includes the first indicator field or whether the first indicator field is valid.

Optionally, the determining device is further configured to: when it is determined that the downlink control channel is to schedule retransmission, determine that the downlink control channel includes the first indicator field or the first indicator field is valid, or when it is determined that the downlink control channel is to schedule an initial transmission, determine that the downlink control channel does not include the first indicator field or the first indicator field is invalid; or determine whether the first indicator field is included or whether the first indicator field is valid, and set a second indicator field in the downlink control channel, where the second indicator field indicates whether the first indicator field exists or whether the first indicator field is valid; or determine whether the terminal device supports CBG-based transmission, and set a third indicator field in the downlink control channel, where the third indicator field indicates whether the terminal device supports the CBG-based transmission; and when the third indicator field indicates that the terminal device supports the CBG-based transmission, determine that the first indicator field is included or the first indicator field is valid; otherwise, determine that the first indicator field is not included or the first indicator field is invalid; or determine whether the terminal device supports the CBG-based transmission, and send a higher layer signal to indicate whether the terminal device supports the CBG-based transmission, and if it is determined that the terminal device supports the CBG-based transmission, determine that the first indicator field is included or the first indicator field is valid; otherwise, determine that the first indicator field is not included or the first indicator field is invalid.

Optionally, the transmit device is further configured to: send a higher layer signal before the base station sends the downlink control channel, where the higher layer signal indicates whether the terminal device supports CBG-based transmission; and if it is determined that the terminal device supports the CBG-based transmission, send, by the base station, the downlink control channel including the first indicator field.

Optionally, the base station further includes a second determining device configured to: when receiving ACK/NACK feedback performed by the terminal device for a CBG scheduled by the downlink control channel, determine that the terminal device generates M*K-bit ACK/NACK feedback information for each TB, where each K-bit information corresponds to one CBG, and K-bit ACK/NACK feedback information of each CBG is arranged in a sequence based on the order of corresponding CBGs in an initial transmission of a TB, or in such a manner that feedback information corresponding to an actually received CBG is ordered ahead and place holding feedback information is ordered behind, or in such a manner that feedback information corresponding to an actually received CBG is ordered behind and place holding feedback information is ordered ahead; and if part CBGs corresponding to an initial transmission of a TB are scheduled by the downlink control channel to be retransmitted, generate NACK as place holding information for a location of an un-retransmitted CBG; or determine that the terminal device generates N*K-bit ACK/NACK feedback information, where each K-bit information corresponds to one CBG, N is a quantity of CBGs in transmission scheduled by the downlink control channel, and K is a preset or preconfigured integer that is greater than or equal to 1.

Embodiment 5 of this application provides a computer apparatus. The apparatus includes a processor, where the processor is configured to execute a computer program stored in a memory, to implement the operations in the method according to Embodiment 1 and Embodiment 3 of this application.

Embodiment 6 of this application provides a computer readable storage medium, storing a computer program. When the computer program is executed by a processor, the operations in the method according to Embodiment 1 and Embodiment 3 of this application is implemented.

Figure 5:
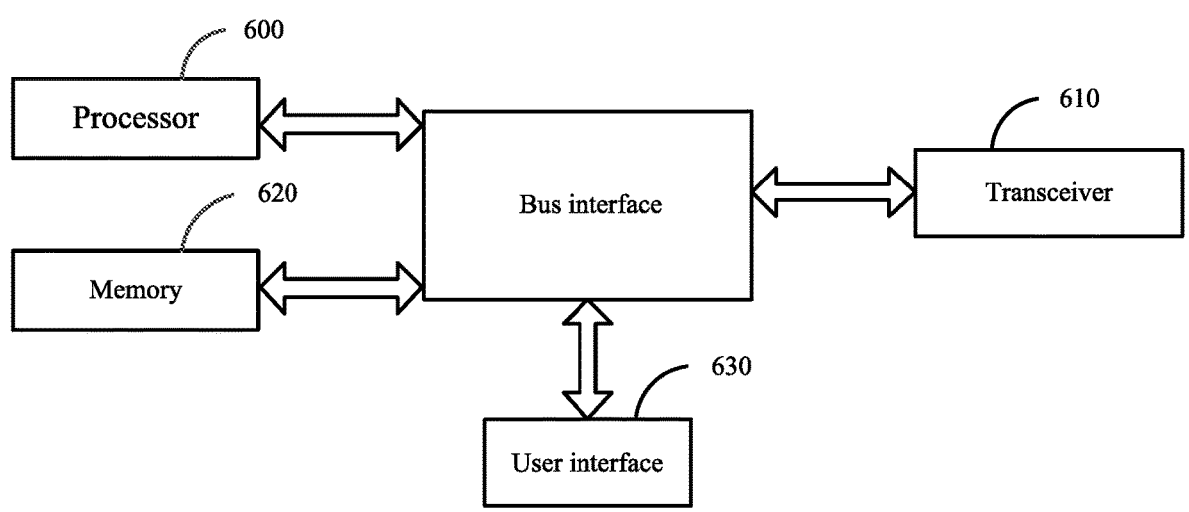
FIG. 5 is a schematic structural diagram of a terminal-side transmission apparatus according to an embodiment of this application.

Referring to FIG. 5, an embodiment of this application provides a transmission apparatus, for example, may be a terminal device, including: a memory 620, configured to store a program instruction; and a processor 600, configured to invoke the program instruction stored in the memory, and perform the following steps according to the obtained program instruction: a downlink control channel is received by using a transceiver 610; and a first indicator field is obtained from the downlink control channel, where the first indicator field indicates whether each code block group (CBG) of CBGs in an initial transmission of a TB needs to be retransmitted.

Optionally, the first indicator field includes A*M-bit indication information, each TB corresponds to M-bit indication information, and each 1-bit in the M-bit information corresponds to one CBG in an initial transmission of a TB, and indicates whether to retransmit the one CBG, where M is a preset or preconfigured quantity of CBGs into which a TB is divided, A is a quantity of TBs included in a shared channel transmission, and M and A are integers greater than or equal to 1.

Optionally, before obtaining the first indicator field from the downlink control channel, the processor 600 is further configured to: determine whether the downlink control channel includes the first indicator field or whether the first indicator field is valid.

Optionally, the determining, by the processor 600, whether the downlink control channel includes the first indicator field or whether the first indicator field is valid specifically includes: when it is determined that the downlink control channel is to schedule retransmission, it is determined that the downlink control channel includes the first indicator field or the first indicator field is valid, or when it is determined that the downlink control channel is to schedule an initial transmission, it is determined that the downlink control channel does not include the first indicator field or the first indicator field is invalid; or determining, by the terminal device based on a second indicator field in the downlink control channel, whether the first indicator field exists is determined, or whether the first indicator field is valid is indicated, where the second indicator field indicates whether the first indicator field exists or whether the first indicator field is valid; or determining according to a third indicator field in the downlink control channel, whether the downlink control channel includes the first indicator field or whether the first indicator field is valid. The third indicator filed indicates whether the terminal device supports CBG-based transmission. When the third indicator field indicates that the terminal device supports the CBG-based transmission, it is determined that the first indicator field is included or the first indicator field is valid; otherwise, it is determined that the first indicator field is not included or the first indicator field is invalid; or a higher layer signal is received, and based on configuration information in the higher layer signal, whether the terminal device supports CBG-based transmission is determined, and if it is determined that the terminal device supports the CBG-based transmission, it is determined that the first indicator field is included or the first indicator field is valid; otherwise, it is determined that the first indicator field is not included or the first indicator field is invalid.

Optionally, when the processor 600 determines, based on the first indicator field, that all CBGs are newly transmitted, the processor 600 reports a NDI toggled state to a media access control (MAC) layer by using the transceiver 610; or when the processor 600 determines, based on the first indicator field, that at least one CBG is retransmitted, the processor 600 reports a NDI un-toggled state to the MAC layer by using the transceiver 610.

Optionally, before the step of receiving the downlink control channel by using the transceiver 610, the processor 600 is further configured to: receive a higher layer signal by using the transceiver 610; determine, based on configuration information in the higher layer signal, whether the terminal device supports CBG-based transmission; and if it is determined that the terminal device supports the CBG-based transmission, receive the downlink control channel including the first indicator field by using the transceiver 610.

Optionally, when performing ACK/NACK feedback for a CBG scheduled by the downlink control channel, the processor 600 is further configured to: generate M*K-bit ACK/NACK feedback information for each TB, where each K-bit information corresponds to one CBG, and K-bit ACK/NACK feedback information of each CBG is arranged in a sequence based on the order of corresponding CBGs in an initial transmission of a TB, or in such a manner that feedback information corresponding to an actually received CBG is ordered ahead and place holding feedback information is ordered behind, or in such a manner that feedback information corresponding to an actually received CBG is ordered behind and place holding feedback information is ordered ahead; and if part CBGs corresponding to an initial transmission of a TB are scheduled by the downlink control channel to be retransmitted, generate NACK as place holding information for a location of an un-retransmitted CBG.

Alternatively, the processor 600 generates N*K-bit ACK/NACK feedback information, where each K-bit information corresponds to one CBG, N is a quantity of CBGs in transmission scheduled by the downlink control channel, and K is a preset or preconfigured integer that is greater than or equal to 1.

The transceiver 610 is configured to receive and send data under the control of the processor 600.

In FIG. 5, a bus architecture may include any quantity of interconnected buses and bridges that may specifically be linked together through various circuits of one or more processors represented by the processor 600 and a memory represented by the memory 620. The bus architecture may also link various other circuits such as peripherals, voltage regulators and power management circuits together. These are commonly known in the art. Therefore, further description is not performed in this specification. A bus interface is configured to provide an interface. The transceiver 610 may be a plurality of elements, that is, may include a transmitter and a receiver, to provide a unit configured to communicate with various other apparatuses on a transmission medium. For different user equipments, a user interface 630 may alternatively be an interface that can connect with an external required device or an internal required device. The to-be-connected device includes but is not limited to a keypad, a monitor, a speaker, a microphone, a joystick, or the like.

The processor 600 is in charge of the bus architecture and usual processing. The memory 620 may store data used when the processor 600 performs an operation.

Optionally, processor 600 may be a central processing unit (CPU), an Application-Specific Integrated Circuit (ASIC), an Field Programmable Gate Array (FPGA), or a Complex Programmable Logic Device (CPLD).

Figure 6:
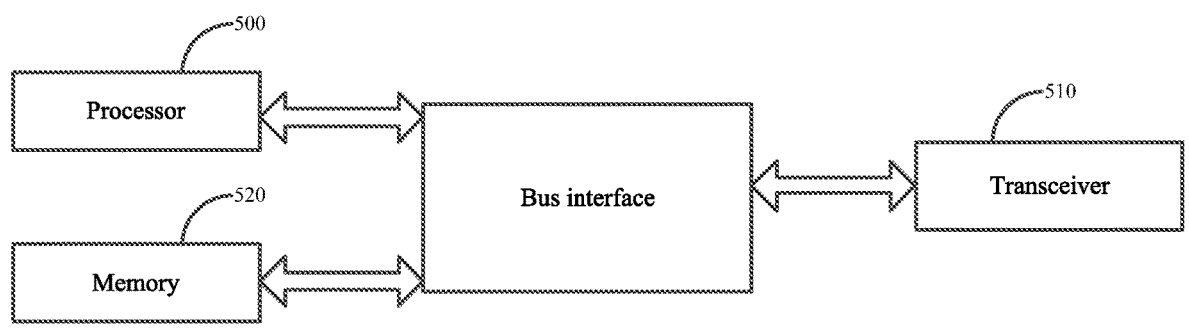
FIG. 6 is a schematic structural diagram of a network-side transmission apparatus according to an embodiment of this application.

Referring to FIG. 6, an embodiment of this application provides another transmission apparatus. For example, the apparatus may be a base station, including: a memory 520, configured to store a program instruction; and a processor 500, configured to invoke the program instruction stored in the memory, and perform the following operation according to the obtained program instruction: a downlink control channel is sent by using a transceiver 510, where the downlink control channel includes a first indicator field, and the first indicator field indicates whether each code block group (CBG) of CBGs in an initial transmission of a TB needs to be retransmitted.

Optionally, the first indicator field includes A*M-bit indication information, each TB corresponds to M-bit indication information, and each 1-bit in the M-bit information corresponds to one CBG in an initial transmission of a TB, and indicates whether to retransmit the one CBG, where M is a preset or preconfigured quantity of CBGs into which a TB is divided, A is a quantity of TBs included in a shared channel transmission, and M and A are integers greater than or equal to 1.

Optionally, before the sending the downlink control channel by using the transceiver 510, the processor 500 is further configured to: determine whether the downlink control channel includes the first indicator field or whether the first indicator field is valid.

Optionally, the determining, by the processor 500, whether the downlink control channel includes the first indicator field or whether the first indicator field is valid specifically includes: when it is determined that the downlink control channel is to schedule retransmission, it is determined that the downlink control channel includes the first indicator field or the first indicator field is valid, or when it is determined that the downlink control channel is to schedule an initial transmission, it is determined that the downlink control channel does not include the first indicator field or the first indicator field is invalid; or whether the first indicator field is included or whether the first indicator field is valid is determined, and a second indicator field is set in the downlink control channel, where the second indicator field indicates whether the first indicator field exists or indicate whether the first indicator field is valid; or whether the terminal device supports CBG-based transmission is determined, and a third indicator field is set in the downlink control channel, where the third indicator field indicates whether the terminal device supports the CBG-based transmission; and when the third indicator field indicates that the terminal device supports the CBG-based transmission, it is determined that the first indicator field is included or the first indicator field is valid; otherwise, it is determined that the first indicator field is not included or the first indicator field is invalid; or whether the terminal device supports the CBG-based transmission is determined, a higher layer signal is sent to indicate whether the terminal device supports the CBG-based transmission, and if it is determined that the terminal device supports the CBG-based transmission, it is determined that the first indicator field is included or the first indicator field is valid; otherwise, it is determined that the first indicator field is not included or the first indicator field is invalid.

Optionally, before the sending the downlink control channel by using the transceiver 510, the processor 500 is further configured to: send a higher layer signal by using the transceiver 510, where the higher layer signal indicates whether the terminal device supports the CBG-based transmission.

If it is determined that the terminal device supports the CBG-based transmission, the processor 500 sends the downlink control channel including the first indicator field by using the transceiver 510.

Optionally, when the processor 500 receives, by using the transceiver 510, ACK/NACK feedback performed by the terminal device for a CBG scheduled by the downlink control channel, the processor 500 is further configured to: determine that the terminal device generates M*K-bit ACK/NACK feedback information for each TB, where each K-bit information corresponds to one CBG, and K-bit ACK/NACK feedback information of each CBG is arranged in a sequence based on the order of corresponding CBG in an initial transmission of a TB, or in such a manner that feedback information corresponding to an actually received CBG is ordered ahead and place holding feedback information is ordered behind, or in such a manner that feedback information corresponding to an actually received CBG is ordered behind and place holding feedback information is ordered ahead; and if part CBGs corresponding to an initial transmission of a TB are scheduled by the downlink control channel to be retransmitted, generating NACK as place holding information for a location of an un-retransmitted CBG; or determine that the terminal device generates N*K-bit ACK/NACK feedback information, where each K-bit information corresponds to one CBG, N is a quantity of CBGs in transmission scheduled by the downlink control channel, and K is a preset or preconfigured integer that is greater than or equal to 1.

The transceiver 510 is configured to receive and send data under the control of the processor 500.

In FIG. 6, a bus architecture may include any quantity of interconnected buses and bridges that may specifically be linked together through various circuits of one or more processors represented by the processor 500 and a memory represented by the memory 520. The bus architecture may also link various other circuits such as peripherals, voltage regulators and power management circuits together. These are commonly known in the art. Therefore, further description is not performed in this specification. A bus interface is configured to provide an interface. The transceiver 510 may be a plurality of elements, that is, may include a transmitter and a receiver, to provide a unit configured to communicate with various other apparatuses on a transmission medium. The processor 500 is in charge of the bus architecture and usual processing. The memory 520 may store data used when the processor 500 performs an operation.

The processor 500 may be a central processing unit (CPU), an application-specific integrated circuit (ASIC), a field programmable gate array (FPGA), or a complex programmable logic device (CPLD).

One or more technical solutions of the foregoing technical solutions have the following technical effects or benefits.

In the transmission method provided in the embodiments of this application, a terminal device receives a downlink control channel, and then obtains a first indicator field from the downlink control channel, where the first indicator field indicates whether each code block group (CBG) of CBGs in an initial transmission of a TB needs to be retransmitted, to resolve a technical problem that no method supporting CBG-based retransmission and ACK/NACK feedback is available in the related art, and achieve a technical effect of improving transmission performance.

A person skilled in the art should understand that the embodiments of this application may be provided as a method, a system, or a computer program product. Therefore, this application may use a form of hardware only embodiments, software only embodiments, or embodiments with a combination of software and hardware. In addition, this application may use a form of a computer program product that is implemented on one or more computer-usable storage media (including but not limited to a disk memory, a CD-ROM, an optical memory, and the like) that include computer-usable program code.

This application is described with reference to the flowcharts and/or block diagrams of the method, the device (system), and the computer program product according to the embodiments of this application. It should be understood that computer program instructions may be used to implement each process and/or each block in the flowcharts and/or the block diagrams and a combination of a procedure and/or a block in the flowcharts and/or the block diagrams. These computer program instructions may be provided for a general-purpose computer, a special-purpose computer, an embedded processor or a processor of another programmable data processing device to generate a machine, so that the instructions executed by a computer or a processor of the another programmable data processing device generate an apparatus for implementing a specific function in one or more procedures in the flowcharts and/or in one or more blocks in the block diagrams.

These computer program instructions may also be stored in a computer readable memory that can instruct the computer or another programmable data processing device to work in a specific manner, so that the instructions stored in the computer readable memory generate an artifact that includes an instruction apparatus. The instruction apparatus implements a specific function in one or more procedures in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or another programmable device provide steps for implementing a specific function in one or more procedures in the flowcharts and/or in one or more blocks in the block diagrams.

Although some embodiments of this application have been described, a person skilled in the art can make changes and modifications to these embodiments once they learn the basic inventive concept. Therefore, the following claims are intended to be construed as to cover the embodiments and all changes and modifications falling within the scope of this application.

Apparently, a person skilled in the art can make various modifications and variations to embodiments of this application without departing from the spirit and scope of the embodiments of this application. This application is intended to cover these modifications and variations provided that they fall within the scope of protection defined by the following claims and their equivalent technologies.

What is claimed is:

1. A transmission method, applied to a terminal device, the method comprising:
   receiving, by the terminal device, a downlink control channel; and
   obtaining, by the terminal device, a first indicator field from the downlink control channel, wherein the first indicator field indicates whether each code block group (CBG) of CBGs in an initial transmission of a Transport Block (TB) needs to be retransmitted;
   wherein the first indicator field comprises A*M-bit indication information, each TB corresponds to M-bit indication information, and each 1-bit in the M-bit information corresponds to one CBG in an initial transmission of a TB and indicates whether to retransmit the one CBG, wherein M is a preset or preconfigured quantity of CBGs into which a TB is divided, A is a quantity of TBs comprised in a shared channel transmission, and M and A are integers greater than or equal to 1.

2. The method according to claim 1, wherein before the obtaining, by the terminal device, the first indicator field from the downlink control channel, the method further comprises:
   determining, by the terminal device, whether the downlink control channel comprises the first indicator field or whether the first indicator field is valid; and/or
   before the receiving, by the terminal device, the downlink control channel, the method further comprises:
   receiving a higher layer signal;
   determining, according to configuration information in the higher layer signal, whether the terminal device supports CBG-based transmission; and
   when it is determined that the terminal device supports the CBG-based transmission, receiving, by the terminal device, the downlink control channel comprising the first indicator field.

3. The method according to claim 2, wherein the determining, by the terminal device, whether the downlink control channel comprises the first indicator field or whether the first indicator field is valid comprises:
   when it is determined that the downlink control channel is to schedule a retransmission, determining that the downlink control channel comprises the first indicator field or the first indicator field is valid, or when it is determined that the downlink control channel is to schedule an initial transmission, determining that the downlink control channel does not comprise the first indicator field or the first indicator field is invalid; or
   determining, by the terminal device according to a second indicator field in the downlink control channel, whether the first indicator field exists, or whether the first indicator field is valid, wherein the second indicator field indicates whether the first indicator field exists or whether the first indicator field is valid; or
   determining, by the terminal device according to a third indicator field in the downlink control channel, whether the downlink control channel comprises the first indicator field or whether the first indicator field is valid, wherein the third indicator field indicates whether the terminal device supports CBG-based transmission, when the third indicator field indicates that the terminal device supports the CBG-based transmission, determining that the downlink control channel comprises the first indicator field or the first indicator field is valid; when the third indicator field indicates that the terminal device does not support the CBG-based transmission, determining that the downlink control channel does not comprise the first indicator field or the first indicator field is invalid; or
   receiving a higher layer signal, and determining, according to configuration information in the higher layer signal, whether the terminal device supports CBG-based transmission, and when it is determined that the terminal device supports the CBG-based transmission, determining that the downlink control channel comprises the first indicator field or the first indicator field is valid; when it is determined that the terminal device does not support the CBG-based transmission, determining that the downlink control channel does not comprise the first indicator field or the first indicator field is invalid.

4. The method according to claim 1, wherein,
   when the terminal device determines, according to the first indicator field, that all CBGs are newly transmitted, reporting, by the terminal device, a new data indication (NDI) toggled state to a media access control (MAC) layer; or
   when the terminal device determines, according to the first indicator field, that at least one CBG is retransmitted, reporting, by the terminal device, a NDI untoggled state to a MAC layer.

5. The method according to claim 1, wherein when the terminal device performs ACKnowledgement/Non-ACKnowledgement (ACK/NACK) feedback for a CBG scheduled by the downlink control channel, the method further comprises:
   generating, by the terminal device, M*K-bit ACK/NACK feedback information for each TB, wherein each K-bit corresponds to one CBG, and K-bit ACK/NACK feedback information of each CBG is arranged in a sequence based on the order of corresponding CBGs in an initial transmission of a TB, or in such a manner that feedback information corresponding to an actually received CBG is ordered ahead and place holding feedback information is ordered behind, or in such a manner that feedback information corresponding to an actually received CBG is ordered behind and place holding feedback information is ordered ahead; and when part CBGs corresponding to an initial transmission of a TB are scheduled by the downlink control channel to be retransmitted, generating NACK as place holding information for a location of an un-retransmitted CBG;

or generating, by the terminal device, N*K-bit ACK/NACK feedback information, wherein each K-bit corresponds to one CBG, N is a quantity of CBGs in transmission scheduled by the downlink control channel, and K is a preset or preconfigured integer that is greater than or equal to 1.

6. A transmission method, applied to a base station, the method comprising:

sending, by the base station, a downlink control channel, wherein the downlink control channel comprises a first indicator field, and the first indicator field indicates whether each code block group (CBG) of CBGs in an initial transmission of a Transport Block (TB) needs to be retransmitted;

wherein the first indicator field comprises A*M-bit indication information, each TB corresponds to M-bit indication information, and each 1-bit in the M-bit information corresponds to one CBG in an initial transmission of a TB and indicates whether to retransmit the one CBG, wherein M is a preset or preconfigured quantity of CBGs into which a TB is divided, A is a quantity of TBs comprised in a shared channel transmission, and M and A are integers greater than or equal to 1.

7. The method according to claim 6, wherein before the sending, by the base station, the downlink control channel, the method further comprises:

determining, by the base station, whether the downlink control channel comprises the first indicator field or whether the first indicator field is valid; and/or before the sending, by the base station, the downlink control channel, the method further comprises:

sending a higher layer signal, wherein the higher layer signal indicates whether a terminal device supports the CBG-based transmission; and when it is determined that the terminal device supports the CBG-based transmission, sending, by the base station, the downlink control channel comprising the first indicator field.

8. The method according to claim 7, wherein the determining, by the base station, whether the downlink control channel comprises the first indicator field or whether the first indicator field is valid comprises:

when it is determined that the downlink control channel is to schedule a retransmission, determining that the downlink control channel comprises the first indicator field or the first indicator field is valid, or when it is determined that the downlink control channel is to schedule an initial transmission, determining that the downlink control channel does not comprise the first indicator field or the first indicator field is invalid; or determining whether the downlink control channel comprises the first indicator field or whether the first indicator field is valid, and setting a second indicator field in the downlink control channel, wherein the second indicator field indicates whether the first indicator field exists or whether the first indicator field is valid; or determining whether a terminal device supports CBG-based transmission, and setting a third indicator field in the downlink control channel, wherein the third indicator field indicates whether the terminal device supports the CBG-based transmission; and when the third indicator field indicates that the terminal device supports the CBG-based transmission, determining that the downlink control channel comprises the first indicator field or the first indicator field is valid; when the third indicator field indicates that the terminal device does not support the CBG-based transmission, determining that the downlink control channel does not comprise the first indicator field or the first indicator field is invalid; or determining whether a terminal device supports CBG-based transmission, and sending a higher layer signal to indicate whether the terminal device supports the CBG-based transmission, and when it is determined that the terminal device supports the CBG-based transmission, determining that the downlink control channel comprises the first indicator field or the first indicator field is valid; when it is determined that the terminal device does not support the CBG-based transmission, determining that the downlink control channel does not comprise the first indicator field or the first indicator field is invalid.

9. The method according to claim 6, wherein when receiving ACKnowledgement/Non-ACKnowledgement (ACK/NACK) feedback performed by a terminal device for a CBG scheduled by the downlink control channel, the method further comprises:

determining, by the base station, that the terminal device generates M*K-bit ACK/NACK feedback information for each TB, wherein each K-bit corresponds to one CBG, and K-bit ACK/NACK feedback information of each CBG is arranged in a sequence based on the order of corresponding CBGs in an initial transmission of a TB, or in such a manner that feedback information corresponding to an actually received CBG is ordered ahead and place holding feedback information is ordered behind, or in such a manner that feedback information corresponding to an actually received CBG is ordered behind and place holding feedback information is ordered ahead; and when part CBGs corresponding to an initial transmission of a TB are scheduled by the downlink control channel to be retransmitted, generating NACK as place holding information for a location of an un-retransmitted CBG;

or determining, by the base station, that the terminal device generates N*K-bit ACK/NACK feedback information, wherein each K-bit corresponds to one CBG, N is a quantity of CBGs in transmission scheduled by the downlink control channel, and K is a preset or preconfigured integer that is greater than or equal to 1.

10. A terminal device, comprising: at least one processor and a memory, wherein the least one processor is configured to read and execute programs stored in the memory to:

receive a downlink control channel; and obtain a first indicator field from the downlink control channel, wherein the first indicator field indicates whether each code block group (CBG) of CBGs in an initial transmission of a Transport Block (TB) needs to be retransmitted;

wherein the first indicator field comprises A*M-bit indication information, each TB corresponds to M-bit indication information, and each 1-bit in the M-bit information corresponds to one CBG in an initial transmission of a TB and indicates whether to retransmit the one CBG, wherein M is a preset or preconfigured quantity of CBGs into which a TB is divided, A is a quantity of TBs comprised in a shared channel transmission, and M and A are integers greater than or equal to 1.

11. The terminal device according to claim 10, wherein the least one processor is further configured to read and execute programs stored in the memory to:
before the first indicator field is obtained from the downlink control channel, determine whether the downlink control channel comprises the first indicator field or whether the first indicator field is valid; when it is determined that the downlink control channel is to schedule a retransmission, determine that the downlink control channel comprises the first indicator field or the first indicator field is valid, or when it is determined that the downlink control channel is to schedule an initial transmission, determine that the downlink control channel does not comprise the first indicator field or the first indicator field is invalid; determine, according a second indicator field in the downlink control channel, whether the first indicator field exists, or whether the first indicator field is valid, wherein the second indicator field indicates whether the first indicator field exists or whether the first indicator field is valid; determine, according to a third indicator field in the downlink control channel, whether the downlink control channel comprises the first indicator field or whether the first indicator field is valid, wherein the third indicator field indicates whether the terminal device supports CBG-based transmission, when the third indicator field indicates that the terminal device supports the CBG-based transmission, determine that the downlink control channel comprises the first indicator field or the first indicator field is valid, when the third indicator field indicates that the terminal device does not support the CBG-based transmission, determine that the downlink control channel does not comprise the first indicator field or the first indicator field is invalid; and receive a higher layer signal, and determine, according to configuration information in the higher layer signal, whether the terminal device supports CBG-based transmission, when it is determined that the terminal device supports the CBG-based transmission, determine that the downlink control channel comprises the first indicator field or the first indicator field is valid, and when it is determined that the terminal device does not support the CBG-based transmission, determine that the downlink control channel does not comprise the first indicator field or the first indicator field is invalid;
and/or, the least one processor is further configured to read and execute programs stored in the memory to:
receive a higher layer signal before the terminal device receives the downlink control channel;
determine, according to configuration information in the higher layer signal, whether the terminal device supports CBG-based transmission; and
when it is determined that the terminal device supports the CBG-based transmission, receive the downlink control channel comprising the first indicator field.

12. The terminal device according to claim 10, wherein the least one processor is further configured to read and execute programs stored in the memory to:
when the terminal device determines, according to the first indicator field, that all CBGs are newly transmitted, report a new data indication (NDI) toggled state to a media access control (MAC) layer; or
report a NDI un-toggled state to the MAC layer when the terminal device determines, according to the first indicator field, that at least one CBG is retransmitted.

13. The terminal device according to claim 10, wherein the least one processor is further configured to read and execute programs stored in the memory to:
when the terminal device performs ACKnowledgement/Non-ACKnowledgement (ACK/NACK) feedback for a CBG scheduled by the downlink control channel, generate M*K-bit ACK/NACK feedback information for each TB, wherein each K-bit corresponds to one CBG, and K-bit ACK/NACK feedback information of each CBG is arranged in a sequence based on the order of corresponding CBGs in an initial transmission of a TB, or in such a manner that feedback information corresponding to an actually received CBG is ordered ahead and place holding feedback information is ordered behind, or in such a manner that feedback information corresponding to an actually received CBG is ordered behind and place holding feedback information is ordered ahead; and when part CBGs corresponding to an initial transmission of a TB are scheduled by the downlink control channel to be retransmitted, generate NACK as place holding information for a location of an un-retransmitted CBG;
or
generate N*K-bit ACK/NACK feedback information, wherein each K-bit corresponds to one CBG, N is a quantity of CBGs in transmission scheduled by the downlink control channel, and K is a preset or preconfigured integer that is greater than or equal to 1.

14. A base station, comprising: at least one processor and a memory, wherein the least one processor is configured to read and execute programs stored in the memory to:
send a downlink control channel, wherein the downlink control channel comprises a first indicator field, and the first indicator field indicates whether each code block group (CBG) of CBGs in an initial transmission of a Transport Block (TB) needs to be retransmitted;
wherein the first indicator field comprises A*M-bit indication information, each TB corresponds to M-bit indication information, and each 1-bit in the M-bit information corresponds to one CBG in an initial transmission of a TB and indicates whether to retransmit the one CBG, wherein M is a preset or preconfigured quantity of CBGs into which a TB is divided, A is a quantity of TBs comprised in a shared channel transmission, and M and A are integers greater than or equal to 1.

15. The base station according to claim 14, wherein the least one processor is further configured to read and execute programs stored in the memory to:
before the base station sends the downlink control channel, determine whether the downlink control channel comprises the first indicator field or whether the first indicator field is valid; when it is determined that the downlink control channel is to schedule a retransmission, determine that the downlink control channel comprises the first indicator field or the first indicator field is valid, or when it is determined that the downlink control channel is to schedule an initial transmission, determine that the downlink control channel does not comprise the first indicator field or the first indicator field is invalid; determine whether the downlink control channel comprises the first indicator field or whether the first indicator field is valid, and set a second indicator field in the downlink control channel, wherein the second indicator field indicates whether the first indicator field exists or whether the first indicator field is valid; determine whether a terminal device supports CBG-based transmission, and set a third indicator field in the downlink control channel, wherein the third indicator field indicates whether the terminal device supports the CBG-based transmission, and when the third indicator field indicates that the terminal device supports the CBG-based transmission, determine that the downlink control channel comprises the first indicator field or the first indicator field is valid, and when the third indicator field indicates that the terminal device does not support the CBG-based transmission, determine that the downlink control channel does not comprise the first indicator field or the first indicator field is invalid; and determine whether a terminal device supports the CBG-based transmission, and send a higher layer signal to indicate whether the terminal device supports the CBG-based transmission, when it is determined that the terminal device supports the CBG-based transmission, determine that the downlink control channel comprises the first indicator field or the first indicator field is valid, and when it is determined that the terminal device does not support the CBG-based transmission, determine that the downlink control channel does not comprise the first indicator field or the first indicator field is invalid;

and/or, the least one processor is further configured to read and execute programs stored in the memory to:

send a higher layer signal before the base station sends the downlink control channel, wherein the higher layer signal is configured to indicate whether a terminal device supports the CBG-based transmission; and when it is determined that the terminal device supports the CBG-based transmission, send, by the base station, the downlink control channel comprising the first indicator field.

16. The base station according to claim 14, wherein the least one processor is further configured to read and execute programs stored in the memory to:

when receiving ACKnowledgement/Non-ACKnowledgement (ACK/NACK) feedback performed by a terminal device for a CBG scheduled by the downlink control channel, determine that the terminal device generates M*K-bit ACK/NACK feedback information for each TB, wherein each K-bit corresponds to one CBG, and K-bit ACK/NACK feedback information of each CBG is arranged in a sequence based on the order of corresponding CBGs in an initial transmission of a TB, or in such a manner that feedback information corresponding to an actually received CBG is ordered ahead and place holding feedback information is ordered behind, or in such a manner that feedback information corresponding to an actually received CBG is ordered behind and place holding feedback information is ordered ahead; and when part CBGs corresponding to an initial transmission of a TB are scheduled by the downlink control channel to be retransmitted, generate NACK as place holding information for a location of an un-retransmitted CBG;

or determine that the terminal device generates N*K-bit ACK/NACK feedback information, wherein each K-bit corresponds to one CBG, N is a quantity of CBGs in transmission scheduled by the downlink control channel, and K is a preset or preconfigured integer that is greater than or equal to 1.

* * * * *